United States Patent [19]

Satomi et al.

[11] Patent Number: 5,034,285
[45] Date of Patent: Jul. 23, 1991

[54] MAGNETIC HEAD

[75] Inventors: Mitsuo Satomi, Katano; Ken Hirota, Toyonaka; Osamu Inoue, Kobe, all of Japan

[73] Assignee: Matsushita Electric Industrial Co., Ltd., Kadoma, Japan

[21] Appl. No.: 235,717

[22] Filed: Aug. 22, 1988

Related U.S. Application Data

[63] Continuation of Ser. No. 839,265, Mar. 13, 1986.

[30] Foreign Application Priority Data

Mar. 13, 1985 [JP] Japan ............................ 60-50020
Oct. 18, 1985 [JP] Japan ............................ 60-233640

[51] Int. Cl.$^5$ ............................................ G11B 23/00
[52] U.S. Cl. .................................... 428/692; 360/125; 360/126; 428/900
[58] Field of Search ............... 360/125, 126; 428/694, 428/900, 692

[56] References Cited

U.S. PATENT DOCUMENTS

| | | | |
|---|---|---|---|
| 3,518,636 | 6/1970 | Pulliam | 427/131 |
| 4,430,440 | 2/1984 | Wada | 428/900 |
| 4,488,195 | 12/1984 | Yanaguichi et al. | 360/126 |
| 4,535,376 | 8/1985 | Nomura et al. | 360/126 |
| 4,540,638 | 9/1985 | Sakakihara | 428/900 |
| 4,608,293 | 8/1986 | Wada | 427/131 |
| 4,636,420 | 1/1987 | Wada | 428/694 |

OTHER PUBLICATIONS

Patent Abstract of Japan, vol. 7, No. 256 (p. 236), Nov. 15, 1983, pp. 75, 236 JP-A-58 139322 (Matsushita Denki Sangyokk).

*Primary Examiner*—Paul J. Thibodeau
*Attorney, Agent, or Firm*—Cushman, Darby & Cushman

[57] ABSTRACT

A magnetic head has substrate(s) having a thermal expansion coefficient nearly equal to that of a soft magnetic film formed thereon, and the substrate has a composition consisting of $\alpha$-$Fe_2O_3$, or a ceramic composition containing 57–96 mol % of MgO, 2–41 mol % of NiO and 2–41 mol % of $TiO_2$, and the soft magnetic film is an amorphous alloy film.

6 Claims, 4 Drawing Sheets

MAGNETIC HEAD

This is a continuation of application Ser. No. 06/839,265, filed Mar. 13, 1986, which was abandoned upon the filing hereof.

BACKGROUND OF THE INVENTION

1. Field of the Invention

The present invention relates to a magnetic head, especially a magnetic head applied to a medium for high density recording.

2. Description of the Prior Art

Ferrite is conventionally used as a material for a magnetic head core, because it has superior workability and resistance to wear, however, its saturated magnetic flux density Bs is 35–50 % lower than that of alloy materials. The saturation magnetization, Bs, of the material of the head core becomes a problem when ferrite is used as materials for a head core for a medium of high density high coercive force recording, and from that point of view, a sendust or an amorphous alloy are preferred as core materials for a medium for high density recording.

When such alloys are used as materials for a magnetic head core, the specific resistance of the materials are as low as 70–120 $\mu\Omega$ cm, so that the loss of eddy current is large and the magnetic characteristics of the magnetic head formed as a bulk shape is insufficient in the high frequency region. As a result, an amorphous alloy or a sendust for the core material are produced as ribbons by the melt quenching method. The ribbon is layered on both sides by a non-magnetic substrate material with superior resistance to wear. On the other hand, by high densification or narrowing of the tracks makes it difficult to work with such ribbon by machine and creates many problems in manufacturing. Accordingly, the bets method among the conventional methods for producing a magnetic head is to form a thin film core material on a non-magnetic substrate by a thin film manufacturing method such as vapor deposition or sputtering. Furthermore, by using such a thin film core material as a magnetic head with high frequency applications preventing the eddy current loss, laminate type core material mutually formed from the magnetic material and the insulating material, can easily be obtained.

However, the difference between the thermal expansion coefficient of the magnetic material and the non-magnetic substrate causes the of following problems. First, since the thermal expansion coefficient of the sendust alloy is as large as about $150\times10^{-7}/°$ C., and there is no appropriate substrate material having such large thermal expansion coefficient, the magnetic head consists of the combination of the sendust and the substrate material by the adhesive. Further, it is difficult to maintain the gap distance with high precision by using such a method, and such a combination brings about the secular deterioration. Bonding by glass is the most reliable method for maintaining the gap length and the reliability. However, when the thermal expansion coefficients of the magnetic material and the substrate material do not coincide, cracks occur and the magnetic head is thereby removed from the bonded surface. When the magnetic head material is made by each a thin film manufacturing method the magnetic film is stripped from the substrate when the thermal expansion coefficient of the magnetic material and the substrate material do not coincide.

Accordingly, a polycrystalline or single crystalline Mn-Zn ferrite material is used as an amorphous alloy substrate material,; because the thermal expansion coefficient coincides with that of the substrate material (the latter has thermal expansion coefficient is $110-120\times10^{-7}/°$ C.), and the workability and the resistance to wear are superior. These materials are, magnetic materials, and are not used near the gap portion of the magnetic head. Glass is used in maintaining the gap length in the above-mentioned prior art constitution (which are shown in Japanese Patent Unexamined publication Sho 58-133620, Sho 59-94219, etc.)

As shown in FIG. 1, the prior art arrangement has a magnetic material 3 sandwiched between layers of ferrite 1, and glass 2 is used to fill up the areas near the gap 4 in place of the ferrite 1. By such an arrangement, the magnetic head can produce an effective play back signal, however, as the ferrite exhibits deterioration in the S/N ratio from the alloy material, caused by the large degree of running noise, the magnetic head shown in FIG. 1 also has the same effects, although there is no ferrite present near the gap portion. Furthermore, a complex process is necessary for making such a magnetic head.

Another prior art arrangement of the magnetic head which excludes the ferrite on the tape running surface so as to make use of the characteristics of the metal materials is proposed (disclosed in Japanese Patent Un-examined Publication Sho 58-14313, etc.). As shown in FIG. 2, the tape running surface on which the gap 7 is formed, is composed of a metal magnetic material 6 and a non-magnetic substrate material 5. As a the non-magnetic substrate material 5, glass is generally used. The normal glass containing sodium or potassium can be used as the glass material, but is not suitable for use with the amorphous alloy, because the resistance to wear is inferior and the thermal expansion coefficient is low.

Recently, the use of photo-sensitive crystallized glass has been proposed. Therein, the components such as LiO or $SiO_2$ are crystallized by exposure to light. Such materials are adopted as substrate materials because the materials have nearly the same thermal expansion coefficient as that of an amorphous alloy, and the resistance to wear is superior.

On the other hand, use of a ceramic substrate containing $CaO-SrO-TiO_2$ (disclosed in Japanese Patent Unexamined Publication Sho 52-57218), the ceramic substrate containing $NiMnO_2$ (disclosed in Japanese Patent Unexamined Publication Sho 53-16399) or the ceramic substrate containing $MgO-TiO_2$ (disclosed in Japanese Patent Unexamined Publication Sho 58-139322) as the substrate material have been proposed. These substrate materials can have various thermal expansion coefficients selectable in wide range by controlling their composition.

The crystallized glass or the ceramic substrates containing $CaO-SrO-TiO_2$ are, however, chemically unstable due to the presence of alkaline metals or Ca as components, so that the characteristics of the resultant magnetic head become inferior by the adherence magnetic powder on the substrate surface during the running of the magnetic tape or the like. The ceramic substrate containing $NiMnO_2$ has the disadvantages of high manufacturing cost, poor grindability, and low working efficiency in working to a usable shape, because MnO easily changes to $Mn_2O_3$ by oxidization. The magnetic powder from the magnetic tape does not adhere to the substrate surface.

On the other hand, although the above-mentioned problems are not encounted in using a ceramic substrate containing $MgO-TiO_2$. When the thermal expansion coefficient of the ceramic substrate is over $95 \times 10^{-7}/°$ C. (25°–400° C.) the mol ratio of MgO versus $TiO_2$ exceeds 2:1, and the segregated MgO is contained in the sintered body, and causes undesirable deliquescence under high humidity atmosphere.

Considering the above-mentioned prior art together, the substrate material for the magnetic head is required to have the following characteristics.

(1) Having a thermal expansion coefficient equal or near to that of the magnetic metal material.
(2) Having superior machine workability.
(3) Having superior resistance to wear.
(4) Having a non-magnetized character.
(5) On-adherance of magnetic powder from the magnetic tape.
(6) Being chemically stable.
(7) Being thermally stable, in order not to be damaged by heat of bonding glass.

SUMMARY OF THE INVENTION

Accordingly, the purpose of the present invention is to provide an improved magnetic head for a medium for high density recording, and especially to a magnetic head comprising a substrate material having characteristics of equal or near thermal expansion coefficient to that of metal, superior machine workability, superior resistance to wear, nonmagnetization, non-adherance of magnetic powder thereon from magnetic tape and chemical and thermal stability.

A magnetic head in accordance with the present invention comprising:

a magnetic core formed of a soft magnetic material, and a substrate for supporting the magnetic core, mainly composed of $\alpha-Fe_2O_3$ or a sintered substrate composed of 57–96 mol % of MgO, 2–41 mol % of NiO, and 2–41 mol % of $TiO_2$.

DESCRIPTION OF THE PREFERRED EMBODIMENTS

A preferred embodiment of a magnetic head in accordance in the present invention is described with reference to the manufacturing process shown in FIG. 3.

Figure 3A:
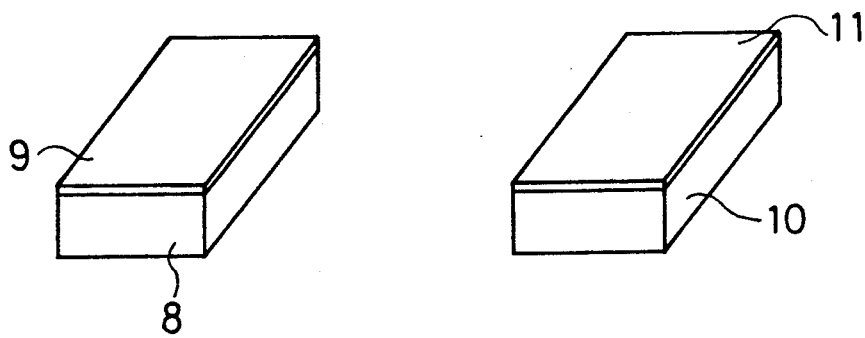
FIG. 3A to 3E is a perspective view of a preferred embodiment of manufacturing process of a magnetic head in accordance with the present invention.

A substrate material 8 is made by sintering $\alpha-Fe_2O_3$ by a hot isostatic pressing process. The thermal expansion coefficient of such substrate material is $110 \times 10^{-7}/°$ C. As shown in FIG. 3A, an amorphous alloy film 9 of a soft magnetic metal film is formed on a mirror finished surface of the substrate material 8 by sputtering. Furthermore, a deposited glass layer 11 for bonding two half pieces of head is bonded to the opposite surface of another substrate material 10 by depositing or sputtering or the like.

Figure 3B:
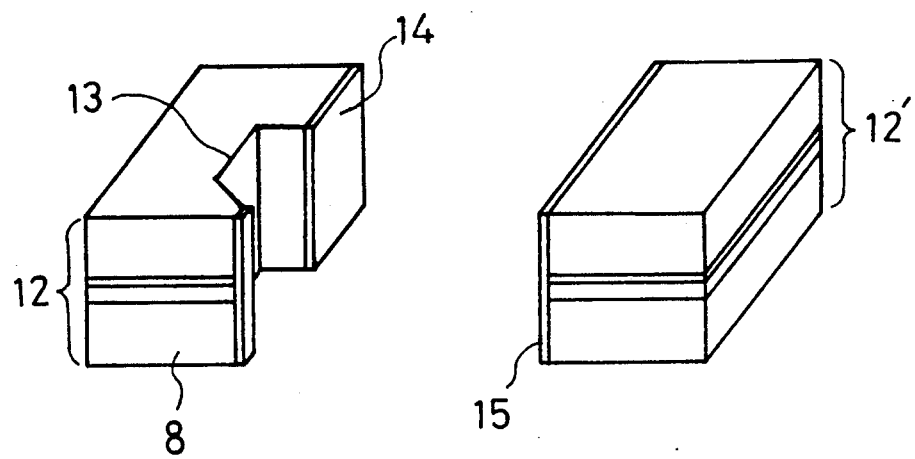
Figure 3C:
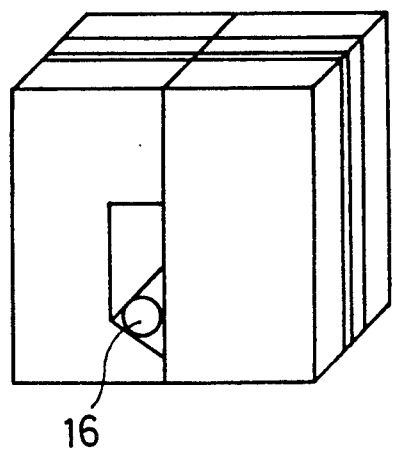
Figure 3D:
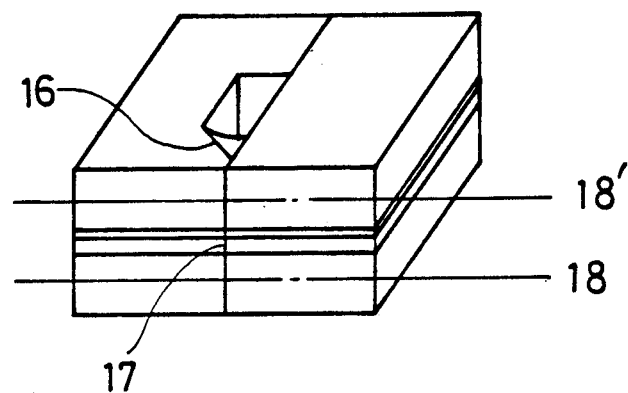
Figure 3E:
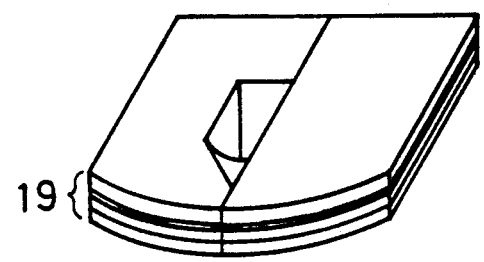

After that, as shown in FIG. 3B, substrate material 10 is placed on the substrate material 8 so that the amorphous alloy film 9 faces to the glass layer 11, and then they are bonded by heating to make core blocks 12 and 12'. Then a coil window 13 is formed on one of such core blocks 12 or 12'. A gap spacer film 14 and a bonding glass film 15 are formed on necessary part of core blocks 12 and 12' by using a thin film manufacturing technique such as sputtering or the like. As shown in FIG. 3C, such core blocks 12 and 12' are bonded by heating, facing the above-mentioned gap spacer film 14 to glass film 15. In this case, a bonding glass 16 on the top of the coil window 13 is melted down at the same time. As mentioned above, a gap 17 which is necessary for magnetic head is formed, as shown in FIG. 3D. By cutting the deposited core blocks as prescribed thickness of the core along the cutting line 18 and 18', and by forming a tape running surface 19, the head chip is completed, as shown in FIG. 3D and FIG. 3E.

Figure 1:
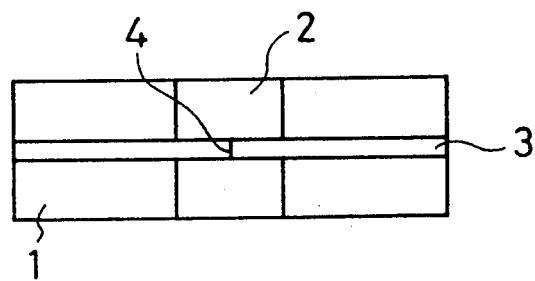
FIG. 1 is a schematic front view of the conventional magnetic head showing the tape running surface.
Figure 2:
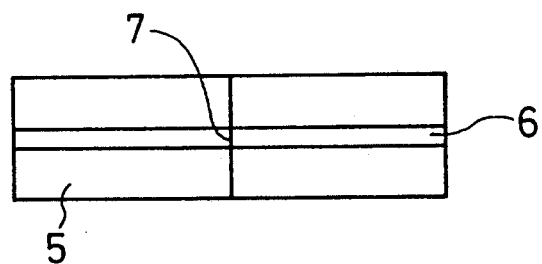
FIG. 2 is the schematic front view of another conventional magnetic head showing the tape running surface.

Table 1 shows the result of experiment for cutting the core blocks to the prescribed thickness in the process shown in FIG. 3D. For information, the result of experiment for cutting the core head of ferrite substrate and crystallized glass substrate, which are shown in FIG. 1 and FIG. 2, are shown at the same time. The size of the core head and the condition of cutting are all the same.

TABLE 1

|  | Cutting at speed of 100 mm/min. | Load current of spindle motor (Cutting speed is 20 mm/min.) |
|---|---|---|
| head of the present invention | is possible | 1 |
| head of Mn—Zn single crystalline substrate | is possible | 1 |
| head of crystallized glass substrate | is not possible | 5 |

As shown in table 1, the substrate material of the present invention and the Mn-Zn substrate material were able to be cut at accelerated cutting speeds, but in the case of the crystallized glass substrate material, cutting was impossible due to the head breaking out on the gap surface or when the spindle motor stops.

When measuring the load current of the spindle motor when the cutting speed was 20 mm/minute in which every substrate material of the magnetic head can be cut, the load currents for cutting the substrate material of the present invention and the Mn-Zn substrate material were equal, but the load current for cutting the crystallized glass substrate material was five times as large as that of the present invention. Now, the load current of cutting of the substrate material of the present invention is standardized as 1.

As mentioned above, the crystallized glass substrate material was inferior in machine workability, and the substrate material of the present invention had superior workability the same as that of ferrite.

Table 2 shows the measuring result of C/N characteristics and out put of the magnetic heads of such substrate materials when installed in a video tape recorder (relative velocity of the head and the tape was 3.8 m/second) and running the metal particulate tape, under the condition that the temperature was in 23° C. and the relative humidity was 70% (in each case, the output or characteristics of the present invention were normalized as 0dB).

Furthermore, table 2 shows the magnetic output of the heads under the condition that the temperature was 23° C. and the relative humidity was 10%.

TABLE 2

|  | 23° C., 70% RH | | 23° C., 10% RH out put of the head |
|---|---|---|---|
|  | out put of the head | characteristics of C/N | |
| head of the present invention | 0dB | 0dB | 0dB |
| head of Mn—Zn single crystalline substrate | 0dB | −2dB | −3dB |
| head of crystallized glass substrate | 0dB | 0dB | −5dB |

As shown in table 2, the magnetic head of the Mn-Zn substrate was inferior by 2dB in the characteristic of C/N because the occurence of of the rubbing noise. And also, under the magnetic condition of 23° C. and 10% of low humidity, the heads not including the magnetic heads of the present invention had glass near the gap portion, so that their outputs decreased by 3–5dB because of the adherance of magnetic materials of the tape on the running surface of the heads.

Figure 4:
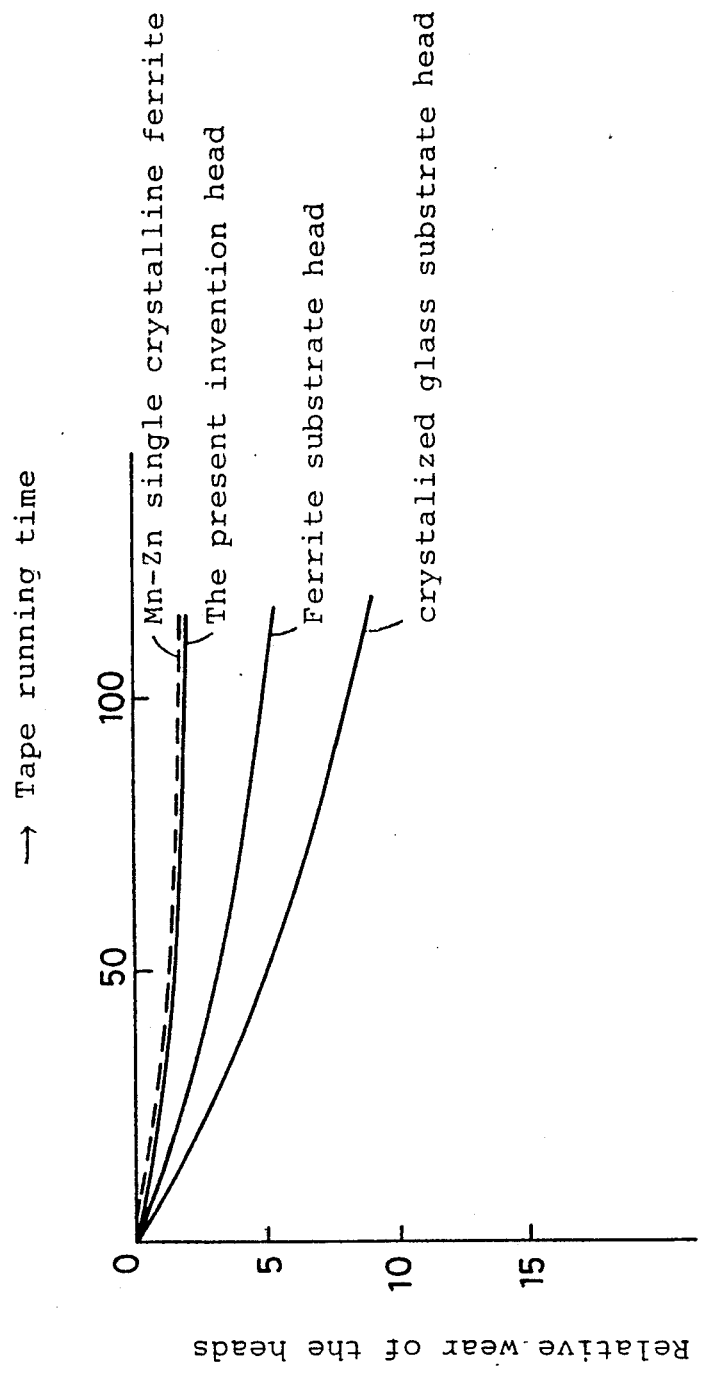
FIG. 4 illustrates characterized curves of the resistance to wear of a magnetic head in accordance with the present invention.

FIG. 4 shows the wear of several magnetic heads composed of different substrate materials compared with that of Mn-Zn single crystalline ferrite as a function of running time. The wear of the magnetic head of the crystallized glass substrate was the heaviest, next the magnetic head of ferrite substrate, and the resistance wear of the magnetic head of the present invention was the highest and it was nearly equal to that of Mn-Ze single crystalline ferrite.

The wear made of the magnetic head of ferrite substrate was greater than that of Mn-Zn single crystalline ferrite, because the gap portion of the former was constituted by the glass and the resistance to wear of the glass was inferior to that of ferrite.

In a preferred embodiment of the present invention, the substrate is made of sintered $\alpha\text{-Fe}_2\text{O}_3$ by hot isostatic pressing, but the most preferable one is of single crystalline $\alpha\text{-Fe}_2\text{O}_3$. The crystallographic axis of the single crystal is constant, and so the wear in tape occurs uniformly, and the surface roughening is very little. And in the single crystalline $\alpha\text{-Fe}_2\text{O}_3$, the thermal expansion coefficients of axis of A and C differ by about $20 \times 10^{-7}/°$ C. from each other (poly-crystal has a value nearly in the center of both values), the single crystal has merit by using the desired thermal expansion coefficient by controlling the direction of the crystallographic axis.

The single crystalline $\alpha\text{-Fe}_2\text{O}_3$, however, has not been yet manufactured in large size and large quantities as single crystalline Mn-Zn, partly because of the restriction of the manufacturing apparatus in the existing technology, so that it is produced only in the laboratory.

The poly-crystal having the oriented crystallographic axis is the next preferable substrate. The mold body having oriented C-axis is easily obtained by wet tape formation using $\alpha\text{-Fe}_2\text{O}_3$ powder with a shape of hexagonal plate as the starting material. And by sintering such a mold body, a sintered body having an oriented C-axis is obtained. Furthermore, by cutting such sintered body along the orientation, it has the effect near the single crystal in using the substrate.

The sintered body of $\alpha\text{-Fe}_2\text{O}_3$ is most easily and inexpensively manufactured by using $\alpha\text{-Fe}_2\text{O}_3$ or $\gamma\text{-FeOOH}$ as starting material and forming it in a predetermined shape, sintering and densifying the formed body. The higher the density of such formed body is, the more dense such sintered body is in such case.

A normal sintering method, hot pressing method, hot isostatic pressing method or any suitable combination of these methods may be used for the densification of the above-mentioned poly-crystal.

When considering the surface roughening caused by the difference between the crystallographic axis in tape running or chipping in machine working, the crystal grain in the sintered body and the number of porocity should be as small as possible. Accordingly, the hot isostatic pressing method is the best.

The of other elements adding to the impurity level against the $\alpha\text{-Fe}_2\text{O}_3$ contained in the starting material, for example adding of $\text{Al}_2\text{O}_3$ or the like for adjusting the thermal expansion coefficient, or adding of $\text{ZrO}_2$ or the like for increasing strength intergranular, are quite permissible.

Further, the existence of the small amount of wustite (FeO), or magnetic ($\text{Fe}_3\text{O}_4$) which are retained or segregated in $\alpha\text{-Fe}_2\text{O}_3$ by varieties of starting materials or sintering conditions, is not a problem, if the obtained sintered body has a non magnetic character permitted in the practical use.

The soft magnetic metal films composed of metal—metal elements such as Co-M (where M is a metal element such as Nb, Ti, Ta, Zr, W or the like) or Co-$M_1$-$M_2$ ($M_1$, $M_2$ are the metal element mentioned above), which shows high magnetic permeability and has larger saturation magnetization than that of Mn-Zn single crystalline ferrite, is preferable for an amorphous alloy metal film, because its resistance to wear is superior than that of the films composed of metal and metalloid elements such as Co-Fe-Si-B or Ni-Si-B. However the Co-Fe-Si-B or Ni-Si-B films are also available, if the films are sandwiched with the substrate of the present invention. The method of forming such an amorphous alloy film is not limited to the sputtering method, and the vapor deposition method, and ribbon type amorphous arrangement formed by the melt quenching method can be used.

The bonding of the substrate materials 8 and 10 or the bonding of the core blocks 12 and 12' are practiced under the conditions of working temperatures lower than the crystallization temperature of the amorphous magnetic alloy film, and using a low melting temperature head glass. In the magnetic head produced by the bonding of a magnetic material and a substrate material by an organic adhesive, other magnetic metal film such as the sendust alloy can be used.

As mentioned above, the present embodiment is described by using the amorphous alloy film of a single layer structure, but use of a laminated type core, wherein a magnetic material and an insulating material are alternately laminated, is for superior to prevent eddy current loss.

Further, other materials for the substrate of the magnetic head in accordance with the present invention are explained as follows.

After measuring the MgO, NiO, and TiO$_2$, and mixing for 16 hours in a ball mill using alcohol as the dispersion medium, the mixture is dried at a temperature of 150° C., a mixed powder containing various compositions was obtained. Furthermore, after calcination of the mixed powder under the temperature of 900° C., the mixed powder was pulverized for sixteen hours in the ball mill and dried at a temperature of 150° C. A mold body was formed by applying pressure of 1000 Kg/Cm$^2$, after granulation of the powder and and adding of a 10 wt% of 5% aqueous solution of poly-vinyl alcohol. The mold body was pressed (300Kg/cm$^2$) and sintered at a temperature between 1200°—1350° C., according to its composition. The density of the sintered bodies was obtained by the Archimedes method that shows that in, every composition of the sintered bodies the sintered true density is greater than 99.5%. Accordingly, by cutting out the test pieces from such sintered bodies, the thermal expansion coefficient of the test pieces in the temperature of 25° C. and 400° C. were measured by a thermal expansion meter. Further, the specific grinding energy of the test piece was obtained from the differences between the consumed electric power of the spindle motor, and the volume decrease of the test material, in the wet type cutting process by using conventional cutting machine with a 100 mm diameter and 0.5 mm thick cutting wheel of artificial diamond abrasive of No. 150, under the condition that the rotating speed of the cutting wheel was 3000 r.p.m., the feed speed was 10 mm/min and the cutting depth was 3 mm. Furthermore, after polishing the test pieces to a mirror finished surface of which surface roughness is Rmax<100 Å, putting into the water, and leaving it for twenty-four hours. Then water proofness of the test pieces were assessed by measuring the surface roughness again. For the comparison, the crystallized glass substrate containing NiMnO$_2$ was measured in the same manner.

Table 3 shows the measured result of such ceramic substrates.

TABLE 3

| Characteristics of ceramics containing MgO—NiO—TiO$_2$ | | | | | | |
|---|---|---|---|---|---|---|
| Component (mol %) | | | Thermal Expanion Coefficient ($\times 10^{-7}$/°C.) | Specific Grinding Energy (J/cm$^3$) | Surface Roughness (Å) | Amount of Offset Wear (Å) |
| MgO | NiO | TiO$_2$ | | | | |
| 98 | 0 | 2 | 125 | 3770 | 2400 | <20 |
| 97 | 1 | 2 | 125 | 3820 | 1960 | <20 |
| 96 | 2 | 2 | 126 | 3880 | 290 | <20 |
| 93 | 2 | 5 | 119 | 1950 | 250 | <20 |
| 75 | 24 | 1 | 123 | 6740 | 210 | <50 |
| 75 | 23 | 2 | 123 | 3820 | 210 | <50 |
| 75 | 13 | 12 | 114 | 2400 | 240 | <30 |
| 75 | 2 | 23 | 97 | 1750 | 280 | <20 |
| 75 | 1 | 24 | 97 | 1690 | 1740 | <20 |
| 70 | 25 | 5 | 123 | 1850 | 190 | <50 |
| 70 | 2 | 28 | 96 | 1780 | 230 | <20 |
| 57 | 41 | 2 | 124 | 2500 | 150 | <70 |
| 57 | 2 | 41 | 96 | 1950 | 210 | <50 |
| 50 | 49 | 1 | 126 | 6710 | 190 | ~200 |
| 50 | 48 | 2 | 125 | 3920 | 180 | ~200 |
| 50 | 25 | 25 | 106 | 1730 | 200 | ~150 |
| 50 | 2 | 48 | 96 | 550 | 230 | ~100 |
| 50 | 1 | 49 | 95 | 510 | 1520 | ~100 |
| 25 | 74 | 1 | 126 | 7490 | 130 | ~400 |
| 25 | 73 | 2 | 125 | 3910 | 130 | ~400 |
| 25 | 53 | 22 | 112 | 1970 | 140 | ~300 |
| 25 | 25 | 50 | 95 | 780 | 150 | ~250 |
| 25 | 24 | 51 | 93 | 720 | 140 | ~250 |
| 2 | 97 | 1 | 128 | 8340 | 120 | ~400 |
| 2 | 96 | 2 | 128 | 4020 | 110 | ~400 |
| 2 | 48 | 50 | 95 | 1060 | 100 | ~300 |
| 2 | 47 | 51 | 94 | 930 | 110 | ~300 |
| 1 | 74 | 25 | 110 | 6220 | 120 | ~400 |
| 0 | 96 | 4 | 124 | 11340 | 100 | ~500 |
| Crystallized Glass | | | 115 | 7750 | — | — |
| MiMnO$_2$ | | | 120 | 10750 | 120 | ~400 |

Next, selection of a substrate comprising 75 mol% MgO, 13 mol% NiO and 12 mol% TiO$_2$, having thermal expansion coefficient of $114 \times 10^{-7}$/° C., and an amorphous magnetic metal film containing Co-Zr is formed on the surface of the substrate by the sputtering, the magnetic heads were made in accordance with the method shown in FIG. 3 (A) to FIG. 3 (E). For the comparison, magnetic heads made of the substrate of the crystallized glass, ceramic substrate containing NiMnO$_2$, and ceramic substrate containing MgO - TiO$_2$, are made in the same manner. The change of output of the magnetic heads, the resistances to wear and the temperature and moisture were stability performed by actually running the metal particulate tape on the surface of running surface of each magnetic heads under various conditions. As a result, after several hours had passed from the start of measuring under the conditions of 902° C. temperature and 50% humidity, the differences in characteristics depending on the variety of substrate were not observed. But under the conditions of a 20° C. temperature and 10 % humidity, the out put level of the magnetic head made of the crystallized glass substrate was decreased by several dB, adherance of the metal powder from the magnetic tape on the substrate surface. Further, under the condition of 40° C. temperature and 80 % humidity, the output of the magnetic head was decreased by 2-3 dB by the segregated MgO, and a step is produced on the surface of the head depending on the diameter of the grain. After about 100 hours had passed, under the conditions of 20° C. temperature and 80 % humidity, with a magnetic head made of a substrate containing MgO-TiO$_2$, the above-mentioned segregated MgO was produced, and the output of the magnetic head was decreased by several dB. The magnetic head made with substrates containing NiMnO$_2$, exhibited a difference in the resistances to wear of the substrate and of the soft magnetic amorphous alloy, and therefore a step was produced on the surface of the head, and the output of the magnetic head was decreased. In contrast the magnetic head in accordance with the present invention made of the substrate of MgO-NiO-TiO$_2$, under a variety of temperature and moisture conditions, the adherence and melting of the magnetic powder and the like do not take place, and the matching of resistances to wear between the substrate and the soft magnetic amorphous alloy was good, and the change of the output of the magnetic head was 1dB.

After about 100 hours of the magnetic tape running, offset wear of the substrate and the soft magnetic amorphous alloy on the tape running surface of the magnetic head were measured by the surface measuring instrument, and the results are shown also in table 3. The amount of offset wear in table 3, means the depth of concave surface of the magnetic material compared with flat surface of the substrate material.

Table 3 shows that the thermal expansion coefficient is increased in proportion with the increase in the total quantity of MgO and NiO, and it is greater when the quantity of NiO is greater provided that the total quantity is constant. On the other hand, the specific grinding energy also shows the same tendency, but in the region where the component is 96 mol% or a smaller quantity of NiO and 2 mol% or greater quantity of MgO is used, the specific grinding energy was sufficiently smaller than that of crystallized glass or ceramic substrate containing $NiMnO_2$, and the maximum value thereof is only ½ of that of the crystallized glass or ceramic substrate. For water-proofness, the surface roughness Rmax which is nearly equal to 2000 Å was obtained for the substrate containing NiO of less than 2 mol%, but in the substrate containing NiO of over 2 mol%, the maximum surface roughness Rmax is less than 300 Å. As mentioned above, for water proofness, over 2 mol% of the quantity of NiO is sufficient. On the contrary, the specific grinding energy increases in proportion to the increase of the quantity of NiO, and the quantity of NiO should be as small as possible in the region over 2 mol%. Considering the controlability of the thermal expansion coefficient, the best region is 5-30 mol%. And also, for the quantity of $TiO_2$, considering the specific grinding energy, the region of 5-50 mol% is desirable. Furthermore, for the offset wear of the magnetic material and the substrate, the condition of large quantity of MgO and the little quantity of NiO is advantageous. Considering the spacing loss between the tape and the magnetic head, under 100 Å of the offset wear is tolerable. Considering all of the above-mentioned, for the substrate material of the magnetic head, the ceramics containing 57-96 mol% of MgO, 2-41 mol% of NiO, and 2-41 mol% of $TiO_2$ is desirable, and especially the ceramics containing 70-93 mol% of Mgo, 2-25 mol% of NiO, and 5-28 mol% of $TiO_2$ is more desirable. The above-mentioned embodiment showed use of amorphous soft magnetic film containing Co-Zr, having thermal expansion of $114 \times 10^{-7}/°$ C. coefficient, but the soft magnetic materials are not limited to this. Namely, for any magnetic core materials such as amorphous other component, alloys or compound such as permalloy, sendust or the like, or Mn-Zn-ferrite, optimum substrate materials can be provided by controlling contents of MgO, NiO and $TiO_2$ responding to the thermal expansion coefficient of the magnetic core materials. The substrate material used in of the present invention contains MgO, NiO and $TiO_2$ as the main components, and small amounts of $ZrO_2$, $SiO_2$ and the like for improving the machine workability and the sintering qualities, and further, necessary impurities may be contained in the material.

As mentioned above, in the magnetic head of the present invention, the thermal expansion coefficient of the substrate material and the magnetic metal material are substantially accorded, and therefore the magnetic film can e made by using known thin film making apparatus, and the glass can be bonded thereto. Furthermore the machine workability and the resistance to wear of the substrate material are superior, and the output of the magnetic head is stable because there is no adherence of magnetic powder of the magnetic tape thereto, so that a very high reliability of the magnetic head can be obtained.

What is claimed is:

1. A core block for a magnetic head comprising:
   a) a magnetic core formed of a soft magnetic material which is an amorphous alloy film containing cobalt, and
   b) a substrate for supporting said magnetic core, consisting essentially of $\alpha$-$Fe_2O_3$, or a sintered substrate comprising 47-96 mol % of MgO, 2-41 mol % of NiO, and 2-41 mol % of $TiO_2$.

2. A core block for a magnetic head in accordance with claim 1, wherein said sintered substrate comprises 70-93 mol % of MgO, 2-25 mol % of NiO and 5-28 mol % of $TiO_2$.

3. A core block for a magnetic head in accordance with claim 1, wherein said amorphous alloy film is formed by a sputtering method.

4. A core block for a magnetic head in accordance with claim 1, wherein said amorphous alloy film is composed of elements including Co-M or Co-$M_1$-$M_2$, wherein M, $M_1$, and $M_2$ are metal elements selected from Nb, Ti, Ta, Zr or W.

5. A core block for a magnetic head in accordance with claim 4, wherein said amorphous alloy film is Co-Nb, Co-Ti, Co-Ta, Co-Zr, Co-W, Co-Nb-Ti, Co-Nb-Ta, Co-Nb-Zr, Co-Nb-W, Co-Ti-Ta, Co-Ti-Zr, Co-Ti-W, Co-Ta-Zr, Co-Ta-W or Co-Zr-W.

6. A core block for a magnetic head comprising:
   a) a magnetic core formed of a soft magnetic material which is an amorphous alloy film containing cobalt, and
   b) a substrate for supporting said magnetic core, consisting essentially of $\alpha$-$Fe_2O_3$ and $ZrO_2$, or a sintered substrate including 57-96 mol % of MgO, 2-41 mol % of NiO, and 2-41 mol % of $TiO_2$.

* * * * *